(12) United States Patent
Vieth et al.

(10) Patent No.: US 8,026,292 B2
(45) Date of Patent: Sep. 27, 2011

(54) CYANATE-BASED, CARBON-DIOXIDE-FILLED STRUCTURED FOAMS AND METHOD FOR THEIR PRODUCTION

(75) Inventors: Siegfried Vieth, Cottbus (DE); Monika Bauer, Senzig (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 24 days.

(21) Appl. No.: 12/197,257

(22) Filed: Aug. 24, 2008

(65) Prior Publication Data

US 2009/0054540 A1 Feb. 26, 2009

(30) Foreign Application Priority Data

Aug. 24, 2007 (DE) .................. 10 2007 040 103

(51) Int. Cl.
*C08J 9/08* (2006.01)
(52) U.S. Cl. .......... 521/99; 521/100; 521/106; 521/122; 521/123; 521/130; 521/134; 521/180; 521/189
(58) Field of Classification Search ............ 521/99, 521/123, 159, 166, 100, 106, 122, 130, 134, 521/180, 189
See application file for complete search history.

(56) References Cited

U.S. PATENT DOCUMENTS

| | | | |
|---|---|---|---|
| 2,981,700 A * | 4/1961 | Parker et al. | 521/129 |
| 4,315,078 A * | 2/1982 | Anorga | 521/103 |
| 4,708,984 A | 11/1987 | Forgione et al. | |
| 5,077,319 A * | 12/1991 | Wang et al. | 521/89 |
| 5,102,923 A * | 4/1992 | Porosoff et al. | 521/159 |
| 5,338,594 A | 8/1994 | Wang et al. | |
| 6,506,808 B1 | 1/2003 | Daum et al. | |
| 6,822,067 B2 | 11/2004 | Bauer et al. | |
| 2003/0176616 A1 | 9/2003 | Bauer et al. | |
| 2006/0025489 A1* | 2/2006 | Yano | 521/99 |

FOREIGN PATENT DOCUMENTS

EP 0457692 B1 9/1995

OTHER PUBLICATIONS

Patent Abstracts of Japan; 2004115638A; Apr. 15, 2004; Resin Composition, Prepreg, and Laminated Sheet; Sumitomo Bakelite Co. Ltd.
Patent Abstracts of Japan; 2000273233A; Oct. 3, 2000; Foamable Polymer Composition; Dainippon Ink & Chem. Inc.
Bauer J. et al: Curing of Cyanates with Primary Amines; Macromol. Chem. Phys. 2001, 202, No. 11; pp. 2213-2220.
Hamerton Ian (editor): Chemistry and Technology of Cyanate Ester Resins; Blackie Academic & Professional ; 1994; p. 117 (London Glasgow Weinheim New York Tokyo Melbourne Madras).
Franck and Biederbick; Kunststoff-Kompendium; Vogel Fachbuch, Vogel Verlag Würzburg, Germany, 1984, pp. 220-231.

* cited by examiner

*Primary Examiner* — John Cooney
(74) *Attorney, Agent, or Firm* — Gudrun E. Huckett

(57) ABSTRACT

The present invention concerns a polycyanurate foam with a structural element A and either terminal amino groups and/or at least one of the following structural elements B, C, or D:

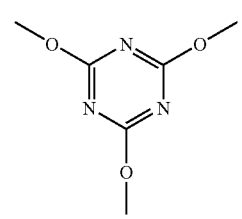

A

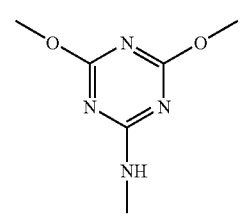

B

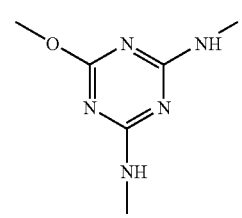

C

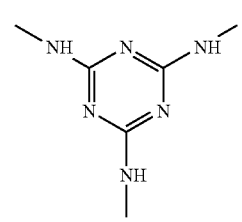

D wherein the foam has closed pores that contain carbon dioxide. This foam can be produced in that a substance is worked into the starting material for the polycyanurate that releases water or alcohol approximately at the start of polymerization either spontaneously or thermally or catalytically induced. The water/alcohol reacts with free cyanate groups under cleavage of $CO_2$. The resulting amino groups can react further in the polymerization.

31 Claims, No Drawings

CYANATE-BASED, CARBON-DIOXIDE-FILLED STRUCTURED FOAMS AND METHOD FOR THEIR PRODUCTION

BACKGROUND OF THE INVENTION

The invention concerns the preparation of novel structured foams on the basis of polycyanurate resin. The foams are characterized by an especially minimal specific weight, high flame retardation and excellent mechanical properties. They are therefore suitable materials for lightweight construction applications in transportation technology, in particular in aviation. The method is based on coupling of the curing process with chemical generation of the foaming agent required for foaming for which purpose in the present invention carbon dioxide is utilized.

The demand in regard to permanent weight reduction, thermal insulation and sound damping as well as increased safety requirements in the transportation sector can be met by increased utilization of high quality structured foams. In addition to excellent mechanical properties, these structural components must also be highly fire-resistant. The requirements imposed in civil aviation (interior furnishings) with respect to fire behavior include minimal flammability, reduced heat release rate, low smoke density as well as minimal toxicity of the gases generated in a fire.

Analog requirements are imposed in the construction of rail vehicles.

Polyurethanes are reactive resin foam materials having the broadest application spectrum because of their excellent price/performance ratio, variability, and excellent processing properties. However, for advanced structural applications in the transportation sector, the inherent fire-relevant properties of the polyurethane hard foams do not suffice. Foams on the basis of high-temperature thermoplastic materials such as PEEK and PEI are only used in niche applications—also because of their high costs—and can be produced only as blocks or as extruded sheets.

Phenolic resin foams are used in mining for stabilizing cavities in rock because of the possibility of foaming multi-dimensional structures in a simple way and because of the excellent inherent flame retardation. As a result of the small closed cell structure, phenolic resin foams belong to foams with the least thermal conductivity and exhibit therefore also excellent thermal insulation properties. Phenolic resin foams are however brittle hard foams that are prone to sand and to form cracks and therefore are not mechanically loadable to a sufficient degree for use in structural applications.

As has been demonstrated many times, cyanate resins have a set of excellent properties combining high inherent flame retardation with excellent thermal and mechanical properties. Polymers of polyfunctional cyanic acid esters of the general formula $R(OCN)_n$ are increasingly used in various applications in particular as laminate resins and adhesives in high-tech areas. They are characterized in particular by a high glass transition temperatures, high decomposition temperatures, low flammability already without addition of flame-retardant additives, high ductility in comparison to other high Tg duromers, low dielectric losses, excellent adhesion to various substrate materials, high chemical resistance, and minimum corrosion potential. Also, they are a material that can be recycled. Therefore, cyanate resins are promising base materials for a variety of applications.

The curing reaction of polycyanates (polycyclotrimerization to polycyanurates) happens relatively slowly for very pure monomers. Contaminants from the monomer synthesis, for example, residual phenols or traces of water, catalyze the curing reaction that is exothermic and therefore easily runs out of control. In order to avoid this, cyanate starting compounds are employed that are as pure as possible and the curing reaction is started in targeted way by addition of suitable catalyst. For this purpose, in particular metal acetyl acetonate, zinc salts, different organometallic compounds as well as phenols and compounds with NH groups such as primary and secondary amines are used. The latter react smoothly with cyanates, as has been known since the 1960s and disclosed, for example, in U.S. 2003/0176616 A1 and the counterpart U.S. Pat. No. 6,822,067 B1. They act therefore not only as catalysts but also as reaction partners for the cyanates. With more than 10 mole % of the amine compound, relative to the cyanate groups, resins are obtained that in addition to the triazine group (A) also contain the following structural elements B, C, and/or D.

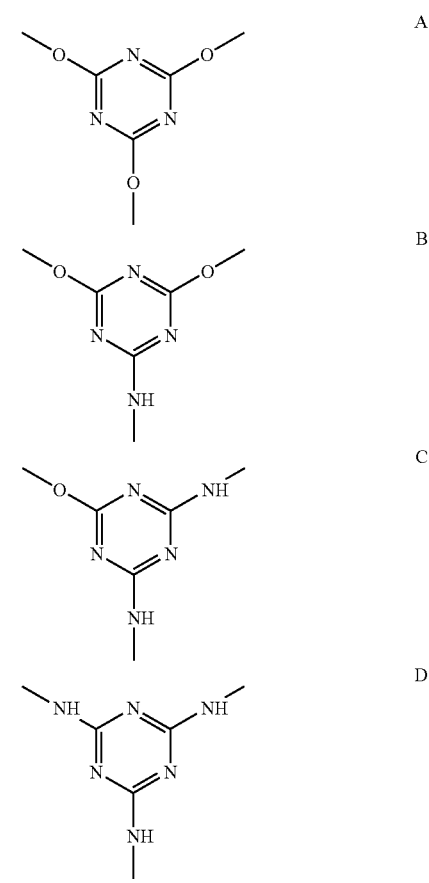

It is desirable to provide also foamed polycyanurates in the form of structural foams because they can fulfill the highest FST requirements (FST=flame, smoke, toxicity). A further advantage is that the ductility of the resin matrix in wide ranges can be tailored to the requirements of the application, respectively. Furthermore, on the basis of cyanate resins foams with excellent thermal insulation properties should be producible because the adjustable processing viscosities are similar to those of phenolic resins and therefore similar cell structures should thus result. Also, cyanate resins, as a result of the chemical mechanism, can be foamed in an environmentally friendly way and they can be recycled at the end of their service life with already known and patented methods.

In the literature there are a few proposals for producing cyanate foams. For example, in EP 0457692 B1 and U.S. Pat. No. 5,077,319 methods are disclosed that are based on foaming mixtures of cyanate resin precursors (e.g. 2,2-bis-(4-cyanatophenyl)methane) and a thermoplastic material such as a polysulfone, polyether sulfone, polyimide, or polyacrylate or the like. Foaming is achieved primarily by a chemical foaming agent (for example, azodicarbonamide). This method is however extremely difficult to handle: the decomposition of this agent with formation of gas is generally exothermic as is the cyanate polymerization; therefore, the latter is hardly controllable. Moreover, the curing temperatures are very high. Optionally, physical foaming agents (e.g. methyl isobutyl ketone) are recommended. Of course, they are unacceptable with regard to environmental concerns and with regard to possible auto ignition. Films of the starting materials are foamed at high temperatures (>200° C.). The materials are also suitable for filling honeycombs (U.S. Pat. No. 5,338,594). The examples of application indicate that the method is suitable only for high contents of thermoplastic material.

According to U.S. Pat. No. 6,506,808 cyanurate prepolymers are loaded at high pressure with $CO_2$. The decompression then leads to foaming. The decompression process is carried out again at high temperatures (170-180° C.). Moreover, only relatively dense foams are obtained ($\rho \approx 1.2$ g/cm$^3$).

SUMMARY OF THE INVENTION

It is an object of the present invention to provide polycyanurate foams that are primarily useable in civil aviation and in rail vehicle construction or in tunnel construction but also in other areas and that therefore simultaneously should fulfill the following requirements:
  three-dimensional large structural components must be producible,
  high mechanical stability,
  fulfillment of very high standards in case of a fire, particularly a high fire resistance of the pressed materials while at the same time having minimal heat release rate, low smoke density as well as minimal toxicity of the gases generated in a fire, preferably according to international standard ISO TC92/SC1 or aviation standard,
  must be capable of being processed as a reactive foam.
In especially preferred embodiments of the invention the foams should moreover fulfill the following requirements:
  minimal weight as a result of low density,
  uniform cell size distribution with minimal cell size,
  primarily closed pore structure,
  minimal moisture sensitivity,
  recyclability.

Providing such foams is however difficult. The cyclotrimerization of cyanates, as mentioned before, is an exothermic process. In order to achieve excellent foam formation, the reaction must be carried out quickly so that within short periods of time large heat quantities are released; this can cause decomposition of the polymer foam. This effect becomes more and more pronounced as the batch size is increased, i.e., in case of industrially relevant quantities.

With advancement of the reaction the viscosity of the cyanate resin increases. Only a narrow viscosity range results in an optimal foam formation. When the viscosity increases too slowly, the foam cells will coalesce, i.e., the foam will collapse. When the viscosity increases too quickly, the foam height is achieved is unsatisfactory.

Surprisingly, according to the invention polycyanurate foam can be obtained without typical chemical foaming agents, such as azodicarbonamide or $CO_2$, having to be added. The foam according to the invention contains in its pores carbon dioxide that has been released in situ by means of water or alcohol from cyanate groups of the cyanate to be polymerized. Accordingly, it contains furthermore the corresponding reaction products of these cyanate groups or their polymerization products and thus the structural element A and either free amino groups and/or at least one of the following structural elements B, C, or D:

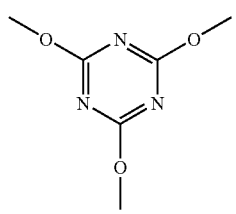

A

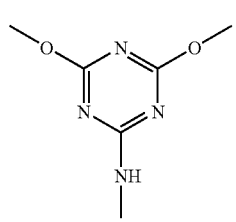

B

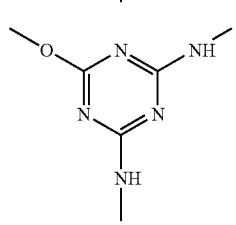

C

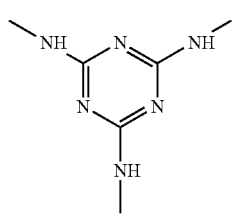

D

The water or the alcohol that for this purpose must reach the material to be polymerized, is formed in situ in accordance with the invention as mentioned above, namely approximately simultaneously with onset of polymerization of the cyanate compounds. For this purpose, a material is added to the starting material(s) to be foamed which material can release water or alcohol, in particular an alcohol with 1 to 4 carbon atoms, physically or chemically (in the following referred to as "water generator" or "alcohol generator"). The release of water or alcohol therefrom is realized substantially synchronously to the start of the polymerization reaction so that the released carbon dioxide blows the solidifying polymer and therefore forms a plurality of closed pores. The foam formation is thus coupled to the polymerization reaction.

When the water generator or alcohol generator releases spontaneously water or alcohol when mixed into the starting material(s) to be foamed, it is necessary to add it with regard to time relatively precisely at the start of polymerization. In all other cases, and thus in general, the point in time of adding the water generator or alcohol generator is not critical. In these cases, the release of water or alcohol is initiated, for example, by heat and/or the addition of a catalyst. The generated water/generated alcohol reacts with some of the free cyanate groups of the cyanate starting material(s) or the pre-polymerized material that is being formed under $CO_2$ cleavage.

The quantity of water that is introduced in this way into the resin being formed can be selected as needed; it has been found to be especially beneficial to add approximately 3 to 3.5 mole %, even more preferred approximately 5 to 15 mole %, and particularly preferred approximately 7 to 12 mole % relative to the cyanate groups that are present.

A plurality of materials are suitable for the release of water or alcohol and thus as a "water generator" or "alcohol generator". A first group comprises compounds that contain water or alcohol bonded in the crystal or held by van der Waals bonds in the molecule, for example, salt hydrates (i.e., salts with water incorporated in the crystal lattice), oxonium compounds, aquoxides and oxide aquates wherein the latter contain a nonstoichiometric quantity of water that is able to migrate in the molecule ("capillary water absorption"; example: $SnO \times nH_2O$). A further group of compounds are those that—optionally in the presence of a catalyst—react with themselves under cleavage of water or alcohol or those that, under water or alcohol cleavage, can react—catalytically or spontaneously—with a reaction partner, i.e., are subject to a condensation reaction with release of these molecules. Examples are amino acids and ester-forming systems (for example, acid plus alcohol) as well as resoles; particularly suitable are however metal or metalloid alcoholates, for example, alkoxy silane, and silanol compounds. The latter produce water or alcohol by a condensation reaction (usually catalyzed by acid or base; for example, by amines) from free SiOH or metal or Si-alkoxide functional groups with formation of metal-O-metal bridges or Si—O—Si bridges.

In the course of cyanate decomposition by the introduced water or the introduced alcohol intermediate products result that, in turn, act as catalysts and co-reactants for the curing reaction, including in particular amines. In case of salt hydrates or metal alkoxides their cations are often also acting catalytically (for example, in case of salts or alkoxides of $Al^{3+}$, $Co^{2+}$, $Cu^{2+}$, $Ni^{2+}$) while in the case where water or alcohol is released in the course of a condensation reaction, the catalyst employed for the condensation can act often at the same time as a catalyst for the curing reaction of the cyanate. This holds true in particular for the condensation of alkoxy silanes or silanols. For this reason, the foam formation is successful at temperatures that are significantly lower than those in currently known methods, namely in general at approximately 100° C. to 160° C. and especially at approximately 120° C. to 140° C. Optionally, the reactivity can be changed (further increased) also by addition of compounds that are known as catalyst for cyanate curing, as mentioned above. Moreover, the water or alcohol-cleaving condensation reaction is a polymerization reaction whose product will solidify so that, in cases in which a condensation reaction is used as a source for water or alcohol, either two components that chemically do not react or react only to a minimal extent with one another convert independent from one another into higher molecular or high-molecular structures and optionally penetrate one another, or, when these two components can also react with one another, excellent mechanical properties can be obtained, for example, higher fracture toughness.

The foam formation according to the invention tolerates the conventional filler additives that are known for cyanate resins. Examples (not to be understood to be limiting in any way) are particles or fibers of graphite, inorganic materials (e.g. $Al_2O_3$, $SiO_2$) or so-called core-shell particles that are comprised of an inorganic core and an organic polymer as a shell. They can be added in a wide quantity range (up to 80% by volume), preferably up to 40% by volume. Even more preferred the filler material quantity is between 3 and 30% by volume and even more preferred between 5 and 20% by volume; 10 to 16% by volume are most preferred.

The foaming method tolerates also the addition of thermoplastic materials, for example, polyether sulfones, polyamides, polyacrylates, polyetherketones, polysulfones and the like. With these additives, for example, the ductility of the cyanate resin foams that tend to be brittle can be improved.

The selection of the multi-functional cyanates to be used as a starting material for the resin is not critical. In principle, any at least bifunctional cyanate body can be utilized including primarily bifunctional or polyfunctional cyanates of the following structures I-III:

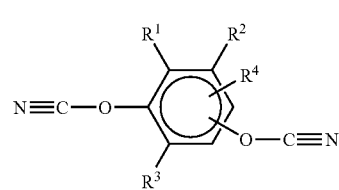

wherein $R^1$ to $R^4$ independent from one another are hydrogen, $C_1$-$C_{10}$ alkyl, $C_3$-$C_8$ cycloalkyl, $C_1$-$C_{10}$ alkoxy, halogen, phenyl oder phenoxy, wherein the alkyl groups or aryl groups can be fluorinated or partially fluorinated; examples are phenylene-1,3-dicyanate, phenylen-1,4-dicyanate, 2,4,5-trifluorophenylene-1,3-dicyanate;

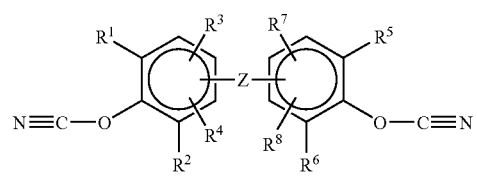

wherein $R^5$ to $R^8$ are the same as $R^1$ to $R^4$ and Z is a chemical bond, $SO_2$, $CF_2$, $CH_2$, CHF, $CH(CH_3)$, isopropylene, hexafluoroisopropylene, $C_1$-$C_{10}$ alkylene, O, $NR^9$, N═N, CH═CH, COO, CH═N, CH═N—N═CH, alkylene oxyalkylene with $C_1$-$C_8$ alkylene, S, $Si(CH_3)_2$ or

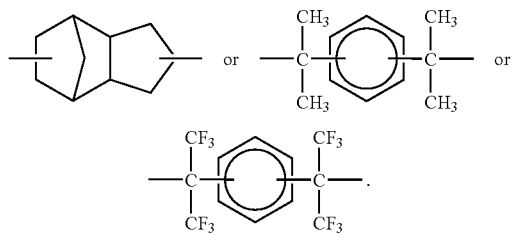

Examples are 2,2-bis(4-cyanato-phenyl)propane, 2,2-bis(4-cyanato-phenyl)hexafluoropropane, biphenylene-4,4'-dicyanate;

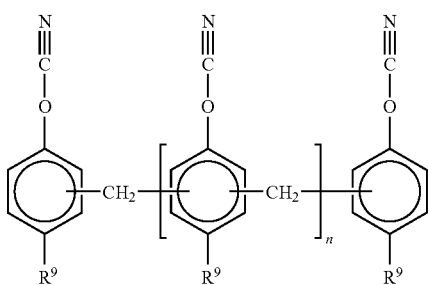

wherein $R^9$ is hydrogen or $C_1$-$C_{10}$ alkyl and n is an integer from 0 to 20.

The aforementioned cyanates can be used as monomers or prepolymers, alone or in mixtures with one another or in mixtures with further monofunctional, bifunctional or polyfunctional cyanates. In addition, or instead, further additives can be added that can be copolymerized with cyanates, for example, mono phenols or diphenols or glycid ethers, as known in the art.

As examples of well suited cyanates the following should be mentioned: dicyanate of bisphenol A (4,4'-dimethylmethylene diphenyldicyanate), 4,4'-ethylidene diphenyl dicyanate or compounds of the formula III wherein n is 1, 2 or 3, $R^9$ is hydrogen and the methylene group is in the ortho position relative to the cyanate, respectively.

When salt hydrates or metal alkoxide are used as water or alcohol generators, they contain preferably bivalent or trivalent cations.

The salt hydrates are used in the form of finely ground powders. Preferably, they are compounds that are insoluble in water or soluble only with difficulty. In particular, substances that have been made hydrophobic are beneficial. It has indeed been found that salt hydrates that are hydrophobic or have been made hydrophobic or similar substances increase the viscosity of the material to be foamed less than untreated hydrophilic compounds for the same level of filling. All conventional materials known in the art are suitable (e.g. alkyl silanes, fatty acids, alkyl phosphates) for making the substances hydrophobic.

As examples for well suited salt hydrates the following should be mentioned: $CO_3(PO_4)_2 \times 8H_2O$, $Pb(acetate)_2 \times 3H_2O$ (or $\times 10H_2O$) and $4MgCO_3 \times Mg(OH)_2 \times 4$ or $5H_2O$ ("artificial alkaline magnesium carbonate", magnesia alba, insoluble in water). Salt hydrates lose their water in particular when heated to temperatures of e.g. in the range of 70-130° C.

When the water or the alcohol for the decomposition of cyanate groups is obtained by condensation processes, particularly siloxanes with free OH or OR groups can be used in addition to silanols and metal alkoxides. Metal alkoxides undergo condensation with formation of M-O-M preferably in the presence of acidic or alkaline catalysts, for example, amines.

As examples of metal alkoxides the following should be mentioned: $R'_a Si(OR)_{4-a}$ or $Al(OR)_3$ with R'=residue bonded by carbon to silicon, a=0 or 1 and R equal $C_1$-$C_4$ alkyl. As silane compounds in particular silsesquioxanes are beneficial because at the temperatures at which the cyanate compounds usually melt they are also liquid and also miscible with the cyanate melt. In this connection, aryl silsesquioxanes such as phenyl silsesquioxanes are especially preferred in many cases, in particular when the employed cyanate starting material(s) also contain phenyl groups because they dissolve especially well in their melt. For this type—as in the case of most alkoxy silanes or silanols—the condensation reaction will be started in particular also when adding catalysts that also act as a catalyst for the cyanurate formation.

The batches to be foamed can contain in minimal amounts a solvent that during the course of foam formation and curing will evaporate so that it contributes to the cell formation and moreover dissipates the heat of reaction.

As a solvent particularly those solvents are suitable that have low polarity or are dipolar aprotic solvents and preferably those that at normal pressure have a boiling point in a temperature range of 120-240° C.

The material of the additive(s) to be optionally added is not critical. In this respect, the usual fillers such as microfillers can be utilized as they are used as reinforcement materials in duromers, i.e., fillers having a particle size distribution such that the focus is within the micrometer range. However, nano fillers with smaller particle sizes (particle size distribution with focus below the μm range) are possible, for example, aerosils with average particle sizes smaller than 100 nm. Alternatively or additionally fibers can be used as fillers, in particular short or cut fibers (preferably of a length in the range of a few μm through the mm range up to fibers of a length of several cm) or whiskers. Independent of whether microfillers and/or nano fillers and/or fibers are used, they are preferably selected from inorganic fillers that are optionally organically modified and/or coated. Inasmuch as the fillers contain organophosphorus components they increase the fire safety. Suitable materials are, for example, silicon dioxide, ceramic materials, organically modified silicones or siloxanes or mixtures thereof, in particular those with very high surface areas and/or small particle sizes, for example, Aerosil® of Degussa, organophosphorus compounds such as EXOLIT OP 930 of Clariant, and optionally organophilically modified bentonite such as Nanofil 2 of Südchemie, or inorganic particles coated with an organic coating (for example, an acrylate) or those having an organic-inorganic matrix, for example, of a hetero organopolysiloxane (so-called core-shell particles). The latter can be constructed such that they have a soft (elastomer) core and a hard (polymer) shell.

Such particles can have for example properties that modify, inter alia, fracture toughness. As a fiber material, in particular materials such as glass, carbon, plastics (for example, polyesters, polyamides) or basalt are suitable.

The fillers can be used alone or in mixtures. Very well-suited are mixtures of different fillers of different materials. Their proportions in the resin, as mentioned above, can be preferably up to 40% by weight.

Optionally, to the starting material for the resins further additives can be added or such additives are subsequently incorporated into the prepolymerized resin. Examples of such additives are surface-modifying agents, for example, agents that reduce the surface tension such as fluorocarbon-modified polymer EFKA-8300 of EFKA Additives BV, The Netherlands, or siloxane PEG copolymer such as DC 198 (Dow Chemicals).

For producing the polycyanurate foam by use of materials that contain water or alcohol bonded in the crystal or held by van der Waals forces, in general first a basic mixture is prepared from cyanate starting compounds to which the water or alcohol generators as well as optionally fillers and/or thermoplastic additives are added. The components can be mixed in the solid state. Also, it is possible to dissolve the cyanate component in a low-boiling solvent (for example, butanone), to disperse or dissolve in the solution the solid materials and other components, and to subsequently remove the solvent by evaporation. Alternatively, a master batch can be prepared from a thermoplastic additive, the water or alcohol generator, and optionally the filler; the master batch is then mixed with the cyanate starting components. To the basic mixture further additives (for example solvents, surface-active agents) are added and the mixture is then heated. Heating leads to the release of water or alcohol. When the water or alcohol generator acts at the same time as a catalyst for cyanurate curing, it is possible but not necessary to add a further catalyst for this purpose. The foam formation starts in a range beginning at approximately 100° C.; in some cases, this temperature can also be somewhat higher, for example, at 110° C. or even in a range of 150° C. or 160° C.

For producing the polycyanurate foam in accordance with the condensation variant, first (if necessary) the cyanate starting compounds and the compound or the system that releases upon condensation water or alcohol (water or alcohol generator, for example, a siloxane containing an OH or OR group) can be melted separately. Fillers or thermoplastic additives can be admixed to the melt. It is also possible to dissolve the cyanate component and/or condensation component in a low-boiling solvent (for example, butanone), to add to this solutions fillers or thermoplastic additives and to subsequently remove the solvent by evaporation so that a melt or suspensions will result again. The (liquid) cyanate and condensation components obtained by the aforementioned variant are mixed, a catalyst solution that catalyzes, if possible, both reactions—the condensation and curing—is added, and then the mixture is heated. The foam formation will begin again starting at approximately 100° C.; however, this temperature can also be somewhat higher in this variant, for example, at 110° C. or even in a range of 150° C. or 160° C.

DESCRIPTION OF PREFERRED EMBODIMENTS

In the following the invention will be explained in more detail with the aid of examples.

Example 1

Condensation Method, with Core-Shell Filler 2,2-bis-(4-cyanatophenyl)propane (quantity: 60%) and Genioperl P52 (a silica gel of the Wacker company whose particles are coated with an organic polymer; as an example of a core-shell filler; quantity: 10%) are mixed in a planetary ball mill. Subsequently, the mixture is kept at a temperature of 135° C. for 30 min. To the mixture that is now present as a suspension (melting of the cyanate resin as a result of the heat treatment) phenyl silsesquioxane dimethylsiloxane copolymer (quantity: 38%) is added. After heat treatment at 135° C. the catalyst solution (zinc acetylacetonate in tetramethylurea, quantity: 0.06% and 1.94%) is added. The foam begins to form after approximately 15 min. after further heat treatment of the mixture at 135° C. After removing from the mold the foam is kept for further removal of volatile organic components 5 hrs. at 220° C.

Example 2

Condensation Method, with Corundum Filler

In accordance with the method disclosed in Example 1, a foam of 2,2-bis-(4-cyanatophenyl)propane (quantity: 60%) and aluminum oxide (corundum, obtained from Alcoa company, quantity 10%), phenyl silsesquioxane dimethylsiloxane copolymer (quantity: 38%) and catalyst solution (zinc acetylacetonate in tetramethylurea, quantity: 0.06% and 1.94%) can be obtained also.

Example 3

Condensation Method, without Filler 2,2-bis-(4-cyanatophenyl)propane (quantity: 70%) and phenyl silsesquioxane dimethylsiloxane copolymer (quantity: 28%) are melted separately, mixed as described in Example 1; to the mixture a catalyst solution (copper stearate in dimethyleneglycol dimethyether, quantity: 0.06% and a 1.94%) is added; foaming is done at 130° C.

Example 4

Salt Hydrate Method, without Filler 2,2-bis-(4-cyanatophenyl)propane (quantity: 80%) and alkaline basic magnesium carbonate (quantity: 10%) are ground in butanone (three times the mass relative to the batch) in a planetary ball mill. After removal of the solvent by evaporation, the residual suspension is mixed with dimethyleneglycol dimethylether (quantity: 2%) and heated to 140° C. After a short period of time foam formation begins.

Example 5

Salt Hydrate Method, Master Batch Variant with Filler

For preparing a master batch, first 10 g of polyethylene glycol 4000, 10 g $Al_2O_3$ made hydrophobic with stearic acid and 8 g $CO_3(PO_4)_2 \times 8H_2O$ with 15 ml butanone are ground for three hours in a planetary ball mill. Subsequently, the solvent is removed by evaporation.

2,2-bis-(4-cyanatophenyl)propane (quantity: 84.2%), the master batch (quantity: 14%), tetramethylurea (quantity: 1.5%) and foam stabilizer DABCO DC 198 (producer: Air Products; quantity: 0.3%) are mixed thoroughly. The mixture is then heated to 135° C. After a short period of time foam formation begins.

The specification incorporates by reference the entire disclosure of German priority document 10 2007 040 103.7 having a filing date of 24 Aug. 2007.

While specific embodiments of the invention have been shown and described in detail to illustrate the inventive principles, it will be understood that the invention may be embodied otherwise without departing from such principles

What is claimed is:

1. A polycyanurate foam, comprising a structural element A and either terminal amino groups and/or at least one of the following structural elements B, C, or D:

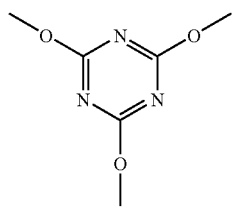

A

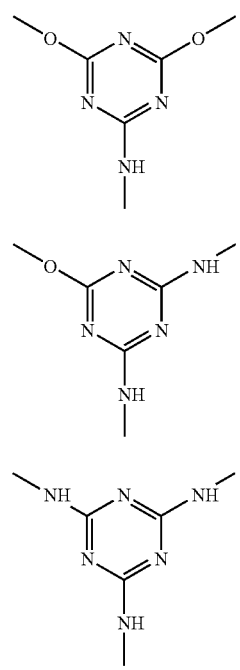

wherein the foam has closed pores that contain carbon dioxide, and further comprising at least one component selected from the group consisting of A) a product of a condensation reaction that releases water or alcohol and B) a substance that is capable of physically bonding and releasing water, alcohol, or water and alcohol, wherein said at least one component has released a portion of, or the entire amount of, water, alcohol, or water and alcohol.

2. The polycyanurate foam according to claim 1, wherein said substance of B) that is capable of physically bonding and releasing water, alcohol, or water and alcohol is at least one salt of one or several metal or metalloid cations.

3. The polycyanurate foam according to claim 2, wherein said metal or metalloid cations are selected from the group consisting of bivalent and trivalent cations.

4. The polycyanurate foam according to claim 2, wherein the salt is a salt hydrate that is capable of releasing at least a portion of its water molecules.

5. The polycyanurate foam according to claim 4, wherein the salt hydrate is soluble in water with difficulty.

6. The polycyanurate foam according to claim 4, wherein the salt hydrate is $CO_3(PO_4)_2 \times 8\ H_2O$ before release of water molecules.

7. The polycyanurate foam according to claim 4, wherein the salt hydrate is a powder that has been made hydrophobic.

8. The polycyanurate foam according to claim 1, wherein said product of A) is a siloxane or an organic ester.

9. The polycyanurate foam according to claim 8, wherein silsesquioxanes are used as a starting material for said condensation reaction.

10. The polycyanurate foam according to claim 1, obtained from at least one bifunctional or polyfunctional organic cyanate, selected from cyanates of the formula I to III and prepolymers of said cyanates I to III:

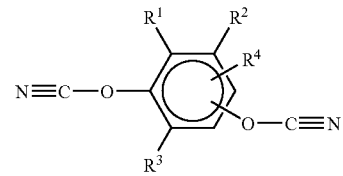

wherein $R^1$ to $R^4$ independent from one another are hydrogen, $C_1$-$C_{10}$ alkyl, $C_3$-$C_8$ cycloalkyl, $C_1$-$C_{10}$ alkoxy, halogen, phenyl oder phenoxy, wherein the alkyl groups or aryl groups can be fluorinated or partially fluorinated;

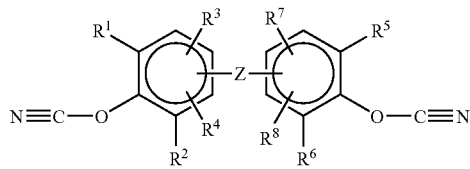

wherein $R^5$ to $R^8$ are the same as $R^1$ to $R^4$ and Z is a chemical bond, $SO_2$, $CF_2$, $CH_2$, CHF, $CH(CH_3)$, isopropylene, hexafluoroisopropylene, $C_1$-$C_{10}$ alkylene, O, $NR^9$, N=N, CH=CH, COO, CH=N, CH=N—N=CH, alkylene oxyalkylene with $C_1$-$C_8$ alkylene, S, $Si(CH_3)_2$,

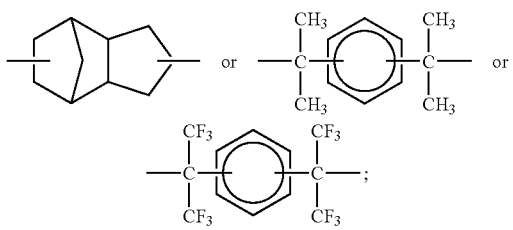

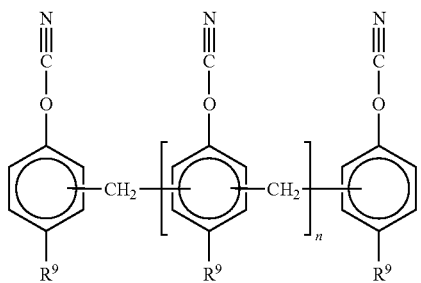

wherein $R^9$ is hydrogen or $C_1$-$C_{10}$ alkyl and n is a value from 0 to 20.

11. The polycyanurate foam according to claim 9, obtained by additionally employing at least one further compound selected from the group consisting of a monofunctional cyanate, a monophenol, a diphenol, and a glycid ether.

12. The polycyanurate foam according to claim 1, further comprising at least one filler.

13. The polycyanurate foam according to claim 12, wherein said at least one filler is selected from the group consisting of microfillers, nano fillers, fibers of inorganic material, fibers of inorganic and organically modified material, and fibers of inorganic and organically coated material.

14. The polycyanurate according to claim 12, wherein said at least one filler is selected from the group consisting of glass, carbon, basalt, silicon dioxide, ceramic materials, organically modified silicones or siloxanes or mixtures thereof.

15. The polycyanurate according to claim 12, wherein said at least one filler has a very high surface areas, a small particle size, or both a very high surface area and a small particle size.

16. The polycyanurate foam according to claim 12, wherein said at least one filler is comprised of core-shell particles.

17. The polycyanurate foam according to claim 12, wherein said at least one filler is selected from at least two different filler materials or at least two different filler sizes or at least two different filler shapes.

18. The polycyanurate foam according to claim 1, further comprising at least one additive selected from the group consisting of surface-modifying agents and surface-tension reducing agents.

19. The polycyanurate foam according to claim 1, further comprising a thermoplastic material as an additive.

20. A method for producing a polycyanurate foam according to claim 1, the method comprising the steps of:
a) providing a basic mixture comprising at least one polymerizable organic cyanate,
b) providing a substance that releases physically or chemically water or an alcohol,
c) mixing the basic mixture and the substance that releases physically or chemically water or an alcohol,
d) effecting release of water or alcohol from the substance that releases physically or chemically water or alcohol, and
e) effecting polymerization of the at least one polymerizable organic cyanate.

21. The method according to claim 20, wherein, in the step c), the substance releasing physically or chemically water or alcohol is admixed in the solid state into the basic mixture and wherein in the steps d) and e) heat is applied and optionally a catalyst is employed.

22. The method according to claim 21, wherein the substance releasing physically or chemically water or alcohol is a salt hydrate that optionally has been made hydrophobic.

23. The method according to claim 22, wherein the salt hydrate contains bivalent and/or trivalent cations and is preferably selected from $Co_3(PO_4)_2 \times 8\ H_2O$ and $4\ MgCO_3 \times Mg(OH)_2 \times 4$ or $5\ H_2O$.

24. The method according to claim 20, wherein the substance releasing physically or chemically water or alcohol is a material that undergoes condensation and, upon condensation, releases water or alcohol, wherein the basic mixture is melted or dissolved in a low-boiling solvent, wherein the substance releasing physically or chemically water or alcohol is introduced in the step c) into the melt or the solution of the basic mixture, and wherein one or several catalysts are added to the mixture of step c) for simultaneously effecting the release of water or alcohol and the polymerization of the at least one cyanate, wherein optionally heat is supplied in the steps d) and e).

25. The method according to claim 24, wherein the substance releasing physically or chemically water or alcohol is a silanol or a metal alkoxide or a metalloid alkoxide.

26. The method according to claim 25, wherein the substance releasing physically or chemically water or alcohol is a silsesquisiloxane or a metal alkoxide or a metalloid alkoxide having the formula $M(OR)_n$ wherein M equal silicon(IV) or aluminum(III), R equal $C_1$-$C_4$ alkyl, and n equal 3 or 4.

27. The method according to claim 20, wherein the at least one cyanate is selected from bifunctional or polyfunctional organic cyanates of the formula I to III and prepolymers of said cyanates I to III

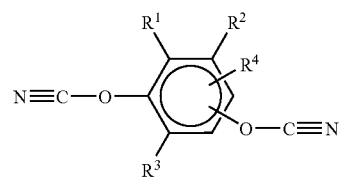

wherein $R^1$ to $R^4$ independent from one another are hydrogen, $C_1$-$C_{10}$ alkyl, $C_3$-$C_8$ cycloalkyl, $C_1$-$C_{10}$ alkoxy, halogen, phenyl oder phenoxy, wherein the alkyl groups or aryl groups can be fluorinated or partially fluorinated;

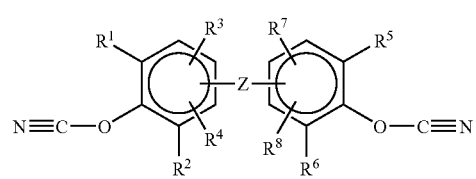

wherein $R^5$ to $R^8$ are the same as $R^1$ to $R^4$ and Z is a chemical bond, $SO_2$, $CF_2$, $CH_2$, $CHF$, $CH(CH_3)$, isopropylene, hexafluoroisopropylene, $C_1$-$C_{10}$ alkylene, O, $NR^9$, N=N, CH=CH, COO, CH=N, CH=N—N=CH, alkylene oxyalkylene with $C_1$-$C_8$ alkylene, S, $Si(CH_3)_2$,

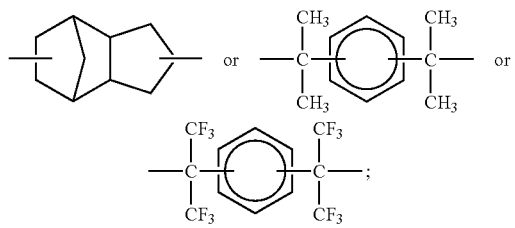

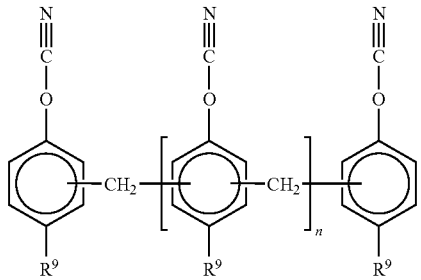

wherein $R^9$ is hydrogen or $C_1$-$C_{10}$ alkyl and n is a value from 0 to 20.

28. The method according to claim 20, wherein the basic mixture contains at least one filler or wherein after the step c) at least one filler is added.

29. The method according to claim 20, wherein the basic mixture contains at least one further additive or wherein, after the step c), at least one further additive is admixed, wherein the additive is selected from surface-modifying agents or surface-tension reducing agents.

30. The method according to claim 20, wherein the basic mixture contains at least one further additive or wherein, after the step c), at least one further additive is admixed, wherein the additive is a thermoplastic material.

31. The method according to claim 20, wherein after the step c) and after admixing optionally additives or fillers, the resulting mixture in the steps d) and e) is heated to a temperature between 110° C. and 150° C. for foaming and after termination of foaming is cooled to room temperature.

* * * * *